US011143426B2

(12) United States Patent
Takahashi et al.

(10) Patent No.: US 11,143,426 B2
(45) Date of Patent: Oct. 12, 2021

(54) THERMAL DEMAND ADJUSTMENT DEVICE FOR ENERGY NETWORK AND THERMAL DEMAND ADJUSTMENT METHOD FOR ENERGY NETWORK

(71) Applicant: Hitachi, Ltd., Tokyo (JP)

(72) Inventors: Hirotaka Takahashi, Tokyo (JP); Tsutomu Kawamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 620 days.

(21) Appl. No.: 15/320,429

(22) PCT Filed: Jun. 20, 2014

(86) PCT No.: PCT/JP2014/066369
§ 371 (c)(1),
(2) Date: Dec. 20, 2016

(87) PCT Pub. No.: WO2015/194024
PCT Pub. Date: Dec. 23, 2015

(65) Prior Publication Data
US 2017/0159959 A1 Jun. 8, 2017

(51) Int. Cl.
*F24F 11/70* (2018.01)
*F24F 11/89* (2018.01)
(Continued)

(52) U.S. Cl.
CPC ............. *F24F 11/70* (2018.01); *F24F 3/06* (2013.01); *F24F 5/0003* (2013.01); *F24F 11/30* (2018.01);
(Continued)

(58) Field of Classification Search
CPC .. F24F 11/70; F24F 11/30; F24F 11/46; F24F 11/65; F24F 11/89; F24F 11/54;
(Continued)

(56) References Cited

U.S. PATENT DOCUMENTS 4,463,574 A 8/1984 Spethmann et al.
6,453,993 B1 * 9/2002 Bujak, Jr. ............. F24F 3/06
165/208
(Continued)

FOREIGN PATENT DOCUMENTS

ER 1 156 286 A2 11/2001
JP 4-198647 A 7/1992
(Continued)

OTHER PUBLICATIONS

Extended European Search Report issued in counterpart European Patent Application No. 14894973.5 dated Jan. 19, 2018 (Nine (9) pages).

(Continued)

*Primary Examiner* — Christopher R Zerphey
*Assistant Examiner* — Melodee Jefferson
(74) *Attorney, Agent, or Firm* — Crowell & Moring LLP (57) ABSTRACT

The purpose of the present invention is to minimize impact on the comfort of people in a room and to achieve energy conservation in heat-source functions in an energy network comprising a plurality of heat-source functions that generate cold water and/or warm water, and a plurality of air-conditioning functions that obtain an air-conditioning effect by consuming the cold water and/or warm water generated by the heat-source functions. Disclosed is an energy network comprising a plurality of heat-source functions that generate thermal energy, and a plurality of air-conditioning functions that obtain an air-conditioning effect by consuming the thermal energy generated by the heat-source functions, wherein the energy network comprises: a first control function that selectively starts or stops the heat-source functions; and a second control function that controls the output of the air-conditioning functions. When the first control function starts or stops the heat-source function(s), the second control (Continued)

function controls the total load of the plurality of air-conditioning functions to a desired magnitude.

8 Claims, 9 Drawing Sheets

(51) Int. Cl.
| | | |
|---|---|---|
| *F24F 5/00* | (2006.01) | |
| *F24F 11/65* | (2018.01) | |
| *F24F 11/30* | (2018.01) | |
| *F24F 11/46* | (2018.01) | |
| *F24F 3/06* | (2006.01) | |
| *G05B 11/06* | (2006.01) | |
| *G05B 13/02* | (2006.01) | |
| *G05B 19/00* | (2006.01) | |
| *G06Q 99/00* | (2006.01) | |
| *H02P 23/00* | (2016.01) | |
| *F24F 140/50* | (2018.01) | |
| *F24F 11/54* | (2018.01) | |

(52) U.S. Cl.
CPC ............. *F24F 11/46* (2018.01); *F24F 11/65* (2018.01); *F24F 11/89* (2018.01); *G05B 11/06* (2013.01); *G05B 13/021* (2013.01); *G05B 19/00* (2013.01); *G06Q 99/00* (2013.01); *H02P 23/00* (2013.01); *F24F 11/54* (2018.01); *F24F 2140/50* (2018.01); *F24F 2221/54* (2013.01)

(58) Field of Classification Search
CPC ........ F24F 3/06; F24F 5/0003; F24F 2221/54; F24F 2140/50; F24F 11/83; G05B 19/00; G05B 13/021; G05B 11/06; G06Q 99/00; H02P 23/00
See application file for complete search history.

(56) References Cited

U.S. PATENT DOCUMENTS

| | | | |
|---|---|---|---|
| 7,249,043 | B1 | 7/2007 | Trout, II et al. |
| 2010/0307731 | A1* | 12/2010 | Yonezawa ................ F24F 3/06 165/223 |
| 2013/0167560 | A1 | 7/2013 | Wong et al. |
| 2015/0345803 | A1 | 12/2015 | Nakao et al. |

FOREIGN PATENT DOCUMENTS

| | | |
|---|---|---|
| JP | 2003-139372 A | 5/2003 |
| JP | 2005-114295 A | 4/2005 |
| JP | 2008-45810 A | 2/2008 |
| JP | 2013-50302 A | 3/2013 |
| JP | 2014-35092 A | 2/2014 |
| JP | 2014-92301 A | 5/2014 |
| KR | 2013-0120865 A | 11/2013 |
| WO | WO 2014/077381 A1 | 5/2014 |

OTHER PUBLICATIONS

International Search Report (PCT/ISA/210) issued in PCT Application No. PCT/JP2014/066369 dated Sep. 2, 2014 with English-language translation (four (4) pages).

* cited by examiner

| DATE | TIME | DAY OF WEEK | OUTSIDE AIR TEMPERATURE | TOTAL COLD WATER DEMAND |
|---|---|---|---|---|
|  |  |  |  |  |
|  |  |  |  |  |
|  |  |  |  |  |
|  |  |  |  |  |

[Fig. 6]

(1) " NUMBER OF OPERATING REFRIGERATORS = 0" OR
" NUMBER OF OPERATING REFRIGERATORS > 0 AND REPRESENTATIVE ROOM TEMPERATURE ≥ REFERENCE TEMPERATURE + $\alpha$"  ($\alpha \geq 0$)

(2) REPRESENTATIVE ROOM TEMPERATURE ≤ REFERENCE TEMPERATURE - $\beta$
($\beta > 0$ ⋯ CASE OF NUMBER OF OPERATING REFRIGERATORS > 1)
($\beta = 0$ ⋯ CASE OF NUMBER OF OPERATING REFRIGERATORS = 1)

(3) " NUMBER OF OPERATING REFRIGERATORS = 0" AND
"REPRESENTATIVE ROOM TEMPERATURE ≥ REFERENCE TEMPERATURE + $\gamma$"  ($\gamma$: INTEGER)

(4) " NUMBER OF OPERATING REFRIGERATORS = 1" AND
"REPRESENTATIVE ROOM TEMPERATURE < REFERENCE TEMPERATURE + $\delta$"  ($\delta$: INTEGER)

[Fig. 7]

| | RATED OUTPUT | LOAD FACTOR | | | | | | | | | | |
|---|---|---|---|---|---|---|---|---|---|---|---|---|
| | | 0.0 | 0.1 | 0.2 | 0.3 | 0.4 | 0.5 | 0.6 | 0.7 | 0.8 | 0.9 | 1.0 |
| REFRIGERATOR A | $P_A$ | $E_{A0}$ | $E_{A1}$ | $E_{A2}$ | $E_{A3}$ | $E_{A4}$ | $E_{A5}$ | $E_{A6}$ | $E_{A7}$ | $E_{A8}$ | $E_{A9}$ | $E_{A10}$ |
| REFRIGERATOR B | $P_B$ | $E_{B0}$ | $E_{B1}$ | $E_{B2}$ | $E_{B3}$ | $E_{B4}$ | $E_{B5}$ | $E_{B6}$ | $E_{B7}$ | $E_{B8}$ | $E_{B9}$ | $E_{B10}$ |
| REFRIGERATOR C | $P_C$ | $E_{C0}$ | $E_{C1}$ | $E_{C2}$ | $E_{C3}$ | $E_{C4}$ | $E_{C5}$ | $E_{C6}$ | $E_{C7}$ | $E_{C8}$ | $E_{C9}$ | $E_{C10}$ |

($E^*$: EFFICIENCY)

THERMAL DEMAND ADJUSTMENT DEVICE FOR ENERGY NETWORK AND THERMAL DEMAND ADJUSTMENT METHOD FOR ENERGY NETWORK

TECHNICAL FIELD

The present invention relates to a thermal demand adjustment device for an energy network and a thermal demand adjustment method for an energy network.

BACKGROUND ART

A technology in which air-conditioning in a room is performed by supplying cold water (warm water) generated by a refrigerator (water heater) through a water pipe to an air conditioner provided in each room is realized. The air conditioner controls temperature of each room by using heat obtained by receiving the cold water (warm water). However, the refrigerator (water heater) is operated to supply the cold water (warm water) corresponding to temperature control. In this technology, in order to achieve energy conservation of efficient energy consumption, a technology in which a target value range of a comfort index value is previously stored, and a system is controlled by the comfort index value within the target value range so as to reduce energy consumption is known. The technology is described in JP-A-2013-50302 (PTL 1).

CITATION LIST

Patent Literature

PTL 1: JP-A-2013-50302

SUMMARY OF INVENTION

Technical Problem

Here, energy consumption of an air conditioner and comfort are generally in a trade-off relationship. That is, in the related art, when the energy consumption of air-conditioning is maximally reduced, the comfort is lowered up to an allowed limit point and this state is continued for a long time. In other words, for example, when temperature that people in the room hope is 26° C. and an upper limit of a comfort range is 28° C., a room temperature is always set to 28° C., in the related art. Accordingly, there is a problem that a setting temperature of the air-conditioning deviates over a long time from a setting temperature (26° C.) that the people in the room hope, and even though the room temperature is in a range which is allowed by the people in the room, the comfort is deteriorated.

An object of the invention is to provide a thermal demand adjustment device for an energy network and a thermal demand adjustment method for an energy network capable of realizing comfort of people in a room even while achieving energy conservation in energy consumption.

Solution to Problem

In order to achieve the object, the invention is intended to adopt a configuration described in a range of aspects, and, according to an example thereof, configured to generate a number of operating units notification signal indicating which heat-source device is to be operated among a plurality of heat-source devices, calculate a thermal demand exchanged in an air conditioner, and generate an instruction value for the air conditioner so as to increase efficiency of the heat-source device based on load characteristics of the heat-source device according to the calculated thermal demand.

Specifically, disclosed is an energy network including a plurality of heat-source functions that generate thermal energy, and a plurality of air-conditioning functions that obtain an air-conditioning effect by consuming the thermal energy generated by the heat-source functions, in which the energy network includes a first control function that selectively starts or stops the heat-source functions, and a second control function that controls output of the air-conditioning functions. When the first control function starts or stops the heat-source functions, the second control function controls the total load of the plurality of air-conditioning functions to a desired magnitude.

Advantageous Effects of Invention

According to the invention, it is possible to realize comfort of people in a room even while achieving energy conservation of energy consumption.

DESCRIPTION OF EMBODIMENTS

Figure 1:
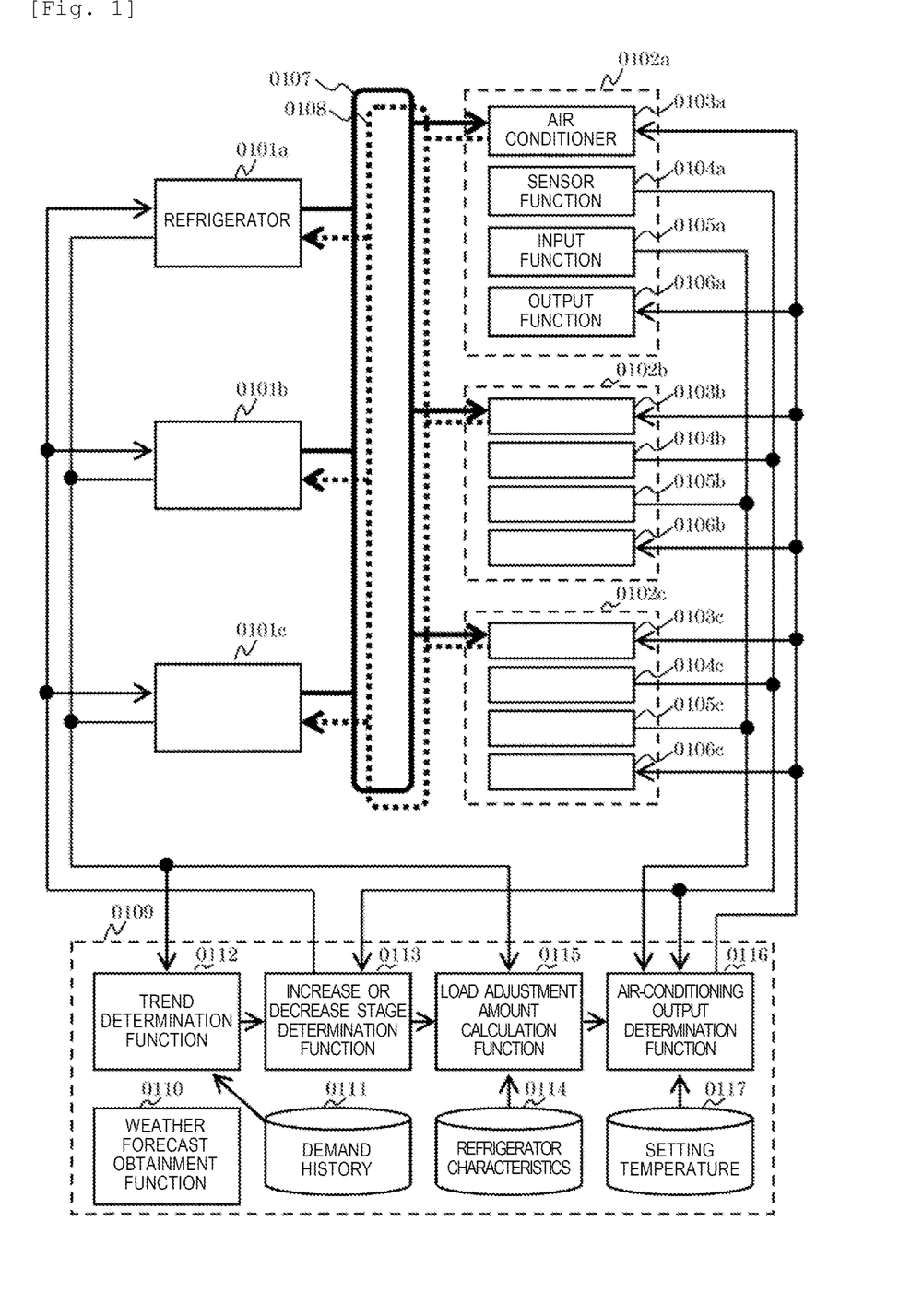
FIG. 1 is an overall system configuration of a thermal demand adjustment device for an energy network.

FIG. 1 is an overall system configuration of a thermal demand adjustment device for an energy network.

Reference numeral 0101 represents a refrigerator (when it is used for heating, instead of operating to perform a freezing function, it is operated to perform a heating function. This is collectively referred to as a "heat-source device"). Here, a case where three refrigerators (0101a, 0101b, and 0101c) are installed as an example is represented. Even though it is not illustrated, the refrigerator 0101 includes a peripheral device (control device of inverter, cooling tower, or the like) required for driving the refrigerator. In addition, the refrigerator 0101 supplies cold water, which will be described below, to a first water pipe 0107, and receives the warm water from a second water pipe 0108 (when being used for heating, the refrigerator supplies warm water to the first water pipe 0107 and receives water of which temperature is lowered from the second water pipe 0108).

The refrigerator 0101 is operated to maintain temperature of the first water pipe 0107 at a predetermined temperature in cooperation with a pump (water supply amount of first water pipe 0107 and second water pipe 0108 is controlled) (not illustrated).

Furthermore, the refrigerator 0101 receives an increase or decrease stage instruction from an increase or decrease stage determination function 0113, which will be described below, and outputs cold water load information to a trend determination function 0112 and a load adjustment amount calculation function 0115.

Reference numeral 0102 represents a room such as an office or the like. An air conditioner 0103, a sensor function 0104, an input function 0105, and an output function 0106, which will be described below, are provided in the room 0102. Here, as an example, a case where the number of rooms in a demand side is three is represented (0102a, 0102b, and 0102c). In addition, devices of 0103 to 0106 are provided in each room.

Reference numeral 0103 represents the air conditioner. The air conditioner 0103 obtains cold heat from the cold water received through the first water pipe 0107, which will be described below, and adjusts temperature of air in the room 0106 by using this. In addition, an amount of the cold heat obtained from the cold water is adjusted based on air-conditioning setting temperature information transmitted by the air-conditioning output function 0116, which will be described below.

Reference numeral 0104 represents a sensor function. The sensor function 0104 outputs a measurement value of a room temperature in the room in which this function is installed and setting temperature information of the air-conditioning to the increase or decrease stage determination function 0113 and the air-conditioning output determination function 0116, which will be described below.

Reference numeral 0105 represents an input function. The input function 0105 is an interface for setting an upper limit value, a reference value, and a lower limit value of the air-conditioning setting temperature by people in the room in which this function is installed. When the room temperature goes up or down under control of a thermal demand adjustment device 0109, the upper limit value of the air-conditioning setting temperature is an upper limit value of the room temperature that the people in the room allow. In addition, when it is assumed that the air-conditioning is operated by setting the air-conditioning setting temperature at all times in a constant, the reference value of the air-conditioning setting temperature is an air-conditioning temperature set by the people in the room. In other words, the reference value is an air-conditioning temperature at which the people in the room feel that the room is in the most comfortable. When the room temperature goes up or down under the control of the thermal demand adjustment device 0109, the lower limit value of the air-conditioning setting temperature is a lower limit value of the room temperature that the people in the room allow.

The input function 0105 outputs the upper limit value, the reference value, and the lower limit value of the air-conditioning setting temperature to the air-conditioning output determination function 0116, which will be described below.

Reference numeral 0106 represents an output function. The output function 0106 displays a setting temperature instructed to the air conditioner 0103 in a corresponding living room in a time series under the control of the thermal demand adjustment device 0109.

Reference numeral 0107 represents the first water pipe. The first water pipe 0107 delivers the cold water generated by the refrigerator 0101 to the air conditioner 0103.

Reference numeral 0108 represents the second water pipe. The second water pipe 0108 delivers warm water after the cold heat is extracted by the air conditioner 0103 to the refrigerator 0101.

Reference numeral 0109 represents the thermal demand adjustment device. The thermal demand adjustment device 0109 can be realized as a general computer. The thermal demand adjustment device 0109 is configured by a weather forecast obtainment function 0110, a demand history database 0111, the trend determination function 0112, the increase or decrease stage determination function 0113, a refrigerator characteristics database 0114, the load adjustment amount calculation function 0115, the air-conditioning output determination function 0116, and a setting temperature database 0117. The thermal demand adjustment device outputs an air-conditioning setting temperature to the air conditioner 0103 at constant intervals such as every 10 minutes, based on the cold water load information of the refrigerator 0101, measurement value information of the sensor function 0104, and setting information of the input function 0105, and the refrigerator 0101 outputs the increase or decrease stage instruction.

Reference numeral 0110 represents the weather forecast obtainment function. The weather forecast obtainment function 0110 obtains outside air temperature information corresponding to a time of a next control cycle from an outside of the thermal demand adjustment device 0109, and the obtained information is transmitted to the trend determination function 0112.

Reference numeral 0111 represents the demand history database. The total of history of cold heat demand (that is, total value of cold water generation amount of entirety of air conditioners) is recorded for each control cycle in the demand history database 0111.

Reference numeral 0112 represents the trend determination function. The trend determination function 0112 obtains an outside air temperature forecast value at a timing of a next control cycle from the weather obtainment function 0110, and past total cold heat demand information from the demand history database 0111, and predicts the total cold heat demand at a timing of a next control cycle. Accordingly, a trend of three types such as whether the total cold heat demand increases, decreases, or is not greatly changed, is determined. A determined result of the trend is output to the increase or decrease stage determination function 0113.

Reference numeral 0113 represents the increase or decrease stage determination function. The increase or decrease stage determination function 0113 determines additional booting (increase stage) and additional stop (decrease stage) of the refrigerator by using the trend of the total cold heat demand output by the trend determination function 0112, and room temperature information output by the sensor function 0104, and outputs the increase or decrease stage instruction to the refrigerator 0101. In addition, information of the number of running refrigerators is output to the load adjustment amount calculation function 0115 at a next control timing.

Reference numeral 0114 represents a refrigerator characteristics database. In the refrigerator characteristics database 0114, rated output information of the refrigerator 0101, and operation efficiency information with respect to a load factor of the refrigerator 0101 are recorded for every refrigerator 0101.

Reference numeral 0115 represents the load adjustment amount calculation function. The load adjustment amount calculation function 0115 calculates the adjustment amount (hereinafter, it will be described as load adjustment amount) of the total cold heat demand required for operating the refrigerator in the maximum efficiency based on the information of the number of running refrigerators at the next control timing output by the increase or decrease stage determination function 0113, recorded information of the refrigerator characteristics database 0114, and the cold water load information output by the refrigerator 0101. Accordingly, load adjustment amount information is output to the air-conditioning output determination function 0116.

Reference numeral 0116 represents the air-conditioning output determination function. The air-conditioning output determination function 0116 determines an instruction value of a setting temperature of each air conditioner 0103, and outputs the determined instruction value to the air conditioner 0103, on the basis of the load adjustment amount information output by the load adjustment amount calculation function 0115, and setting temperature database information, which will be described below.

Reference numeral 0117 represents the setting temperature database. The setting temperature database 0117 is a table in which an increase or decrease amount of setting temperature of the air conditioner 0103 is recorded, and records the increase or decrease amount of the setting temperature of the air conditioner 0103 from a setting temperature before change, the room temperature of the room 0102, and a cold heat amount to be increased by the air conditioner 0103.

Hereinafter, details of each function will be described. First, a function provided in a demand side is illustrated in FIG. 2 and FIG. 3.

Figure 2:
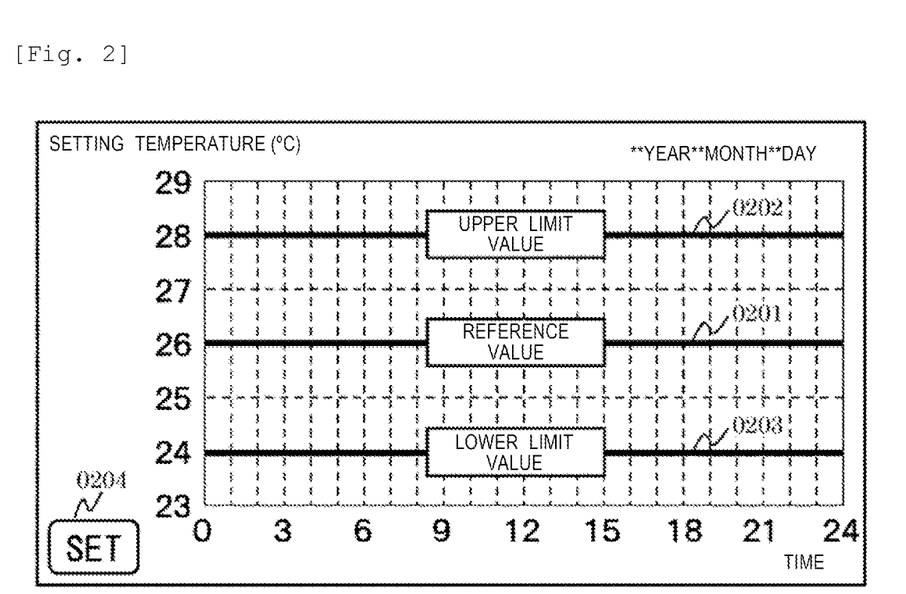
FIG. 2 is an example of an interface of an input function 0105.

FIG. 2 is an example of an interface of the input function 0105. By using the function, the people in the room set a reference value 0201, an upper limit value 0202, and a lower limit value 0203 of the air-conditioning setting temperature. The reference value 0201 is a setting temperature selected by a user when it is not the energy conservation. The upper limit value 0202 is an allowed upper limit value when the thermal demand adjustment device for an energy network in the embodiment controls the air-conditioning setting temperature. The lower limit value 0203 is an allowed lower limit value when the thermal demand adjustment device for an energy network in the embodiment controls the air-conditioning setting temperature. Various devices are considered as a device for setting the reference value 0201, the upper limit value 0202, and the lower limit value 0203 by the people in the room. However, a touch panel on which the reference value 0201, the upper limit value 0202, and the lower limit value 0203 are displayed so as to increase or decrease the respective values is assumed in the embodiment. The reference value 0201, the upper limit value 0202, and the lower limit value 0203 are not necessary to be a constant value regardless of respective time zones, and the values may be changed according to the time zone. Furthermore, a "set" button 0204 is provided in the interface of the input function of the embodiment. When the "set" button 0204 is touched after the people in the room set values of the reference value 0201, the upper limit value 0202, and the lower limit value 0203, information of the reference value 0201, the upper limit value 0202, and the lower limit value 0203 for every time is transmitted to the air-conditioning output determination function 0116.

Figure 3:
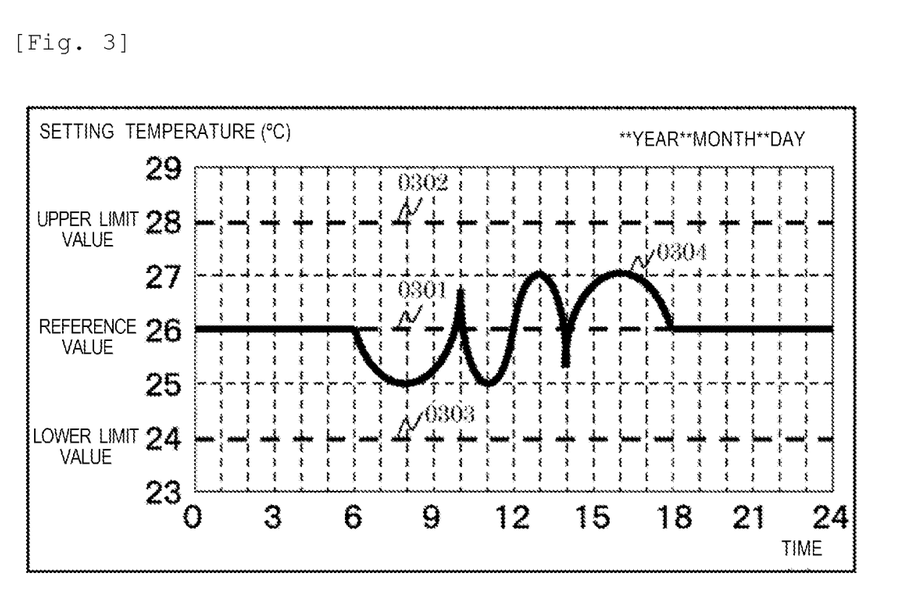
FIG. 3 is an example of an interface of an output function 0106.

FIG. 3 is an example of an interface of the output function 0106. A reference value 0301, an upper limit value 0302, and a lower limit value 0303 are the same values as the reference value 0201, the upper limit value 0202, and the lower limit value 0203 set in the input function 0105 by the people in the room, respectively. Reference numeral 0304 represents the setting temperature of the air conditioner, and is a value that is instructed to the air conditioner 0103 by the air-conditioning output setting function 0116. By displaying the reference value 0301, the upper limit value 0302, the lower limit value 0303, and the setting temperature of the air conditioner 0304 to the output function 0106, since the people in the room can know that the room temperature is within a range between the upper limit value 0302 and the lower limit value 0303, and difference between the room temperature and the reference value 0304, it is possible to increase a degree of satisfaction of the people in the room.

Next, a function provided in the thermal demand adjustment device 0109 will be described.

Figure 4:
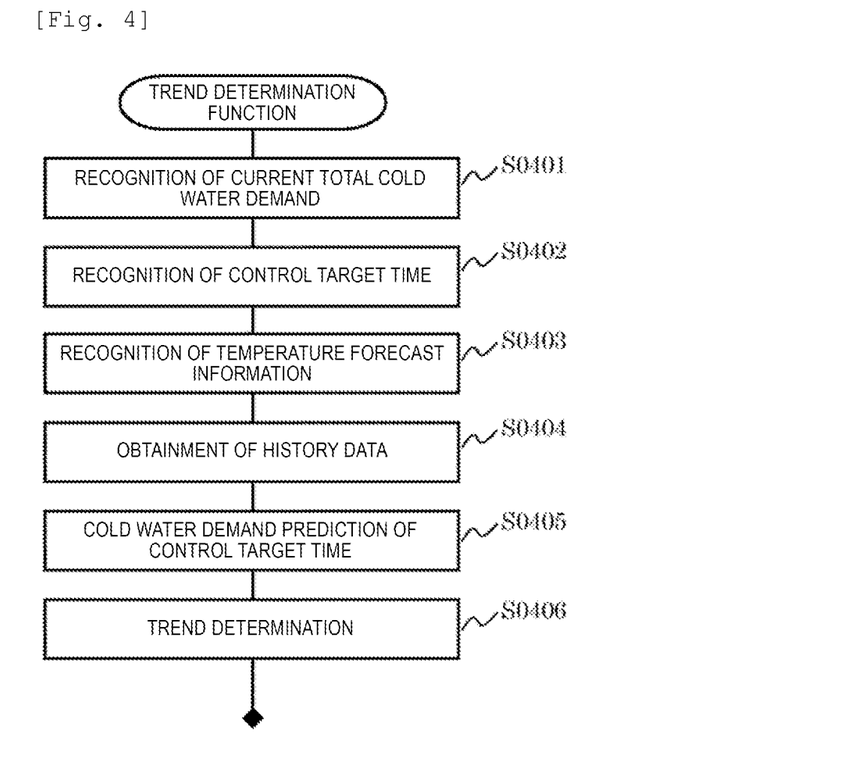
FIG. 4 is a flowchart of a trend determination function 0112.

FIG. 4 is a flowchart of the trend determination function 0112.

S0401 is a process for recognizing the total cold water demand at the current time. The total cold water demand is obtained by summing up cold water loads sent from each refrigerator 0101.

S0402 is a process for recognizing a control target time. The thermal demand adjustment device illustrated in the embodiment repeatedly instructs output of the air conditioner 0103 at constant intervals. In S0402, a time corresponding to the next control cycle with respect to the current time is recognized.

S0403 is a process for recognizing temperature forecast information. In the process, temperature information corresponding to the control target time recognized in S0402 is obtained from the climate forecast obtainment function 0110.

S0404 is a process for obtaining history data. In the process, with reference to the demand history database 0111 illustrated in FIG. 5, the history data coinciding with conditions (date, time, day of week, and outside air temperature) at a timing of a next control cycle is obtained. An obtainment period may be arbitrarily set such as last 30 days from now and 30 days in a future direction from the same date of a year ago.

Figure 5:
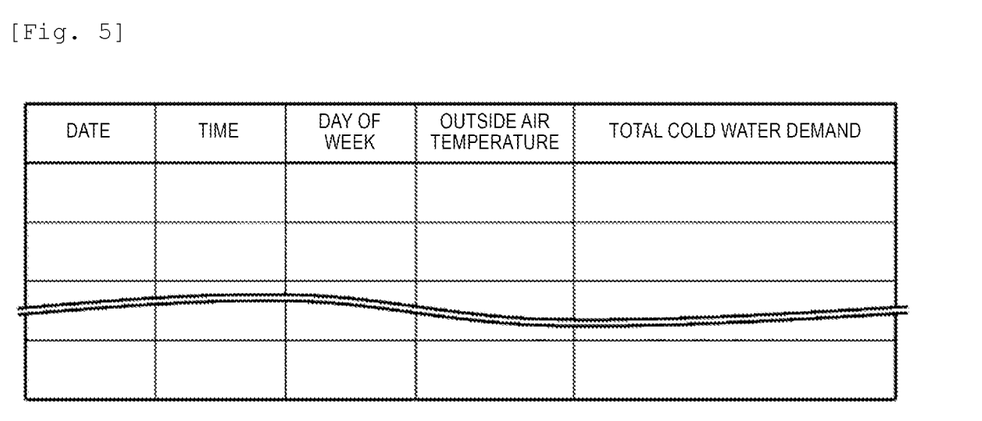
FIG. 5 is an example of a data format of a demand history database 0111.

Here, the demand history database 0111 will be described. FIG. 5 is a data format of the demand history database. In accordance with the format, actual measurement value information of a past total cold water demand is recorded by being correlated with a date, a time, a day of week, and an outside air temperature.

Returning to FIG. 4.

S0405 is a process for predicting a cold water demand of the control target time. In the process, a magnitude of the total cold water demand is predicted at the next control target time on the basis of the history data obtained in S0404. Any method may be used as the prediction method. In the prediction method, for example, it is considered to use a memory based reasoning (MBR) method. If an example of a prediction process of the total cold water demand using the MBR method is mentioned, first, in actual measurement value data of the past total cold water demand extracted in S0404, history data of which both the "day of week" and the "time" are the same as those of the next control target time is selected. Accordingly, by using the selected history data, it is possible to predict the magnitude of the total cold water demand at the next control target time according to performance of the MBR method using an outside air temperature value as parameters.

0406 is a process for performing trend determination. In the process, it is determined whether the total cold water demand amount is a rising trend, a falling trend, or a no change trend, from magnitude difference between a current total cold water demand amount recognized in S0401 and a total cold water demand prediction amount at the next control target time predicted in S0405. An example of a determination method is indicated as Equation 1.

$$\delta P = P1 - P0 \quad \text{Equation 1}$$

Here, P0 is a total cold water demand (obtained in S0401) at the current time, and P1 is a prediction value (obtained in S0405) of the total cold water demand at the next control target time. Accordingly, it is determined that it is the rising trend in a case of $\delta P > X$,
it is the no change trend in a case of $Y \leq \delta P \leq X$, and
it is the falling trend in a case of $\delta P < Y$.

A determined result of the trend is sent to the increase or decrease stage determination function 0113.

Figure 6:
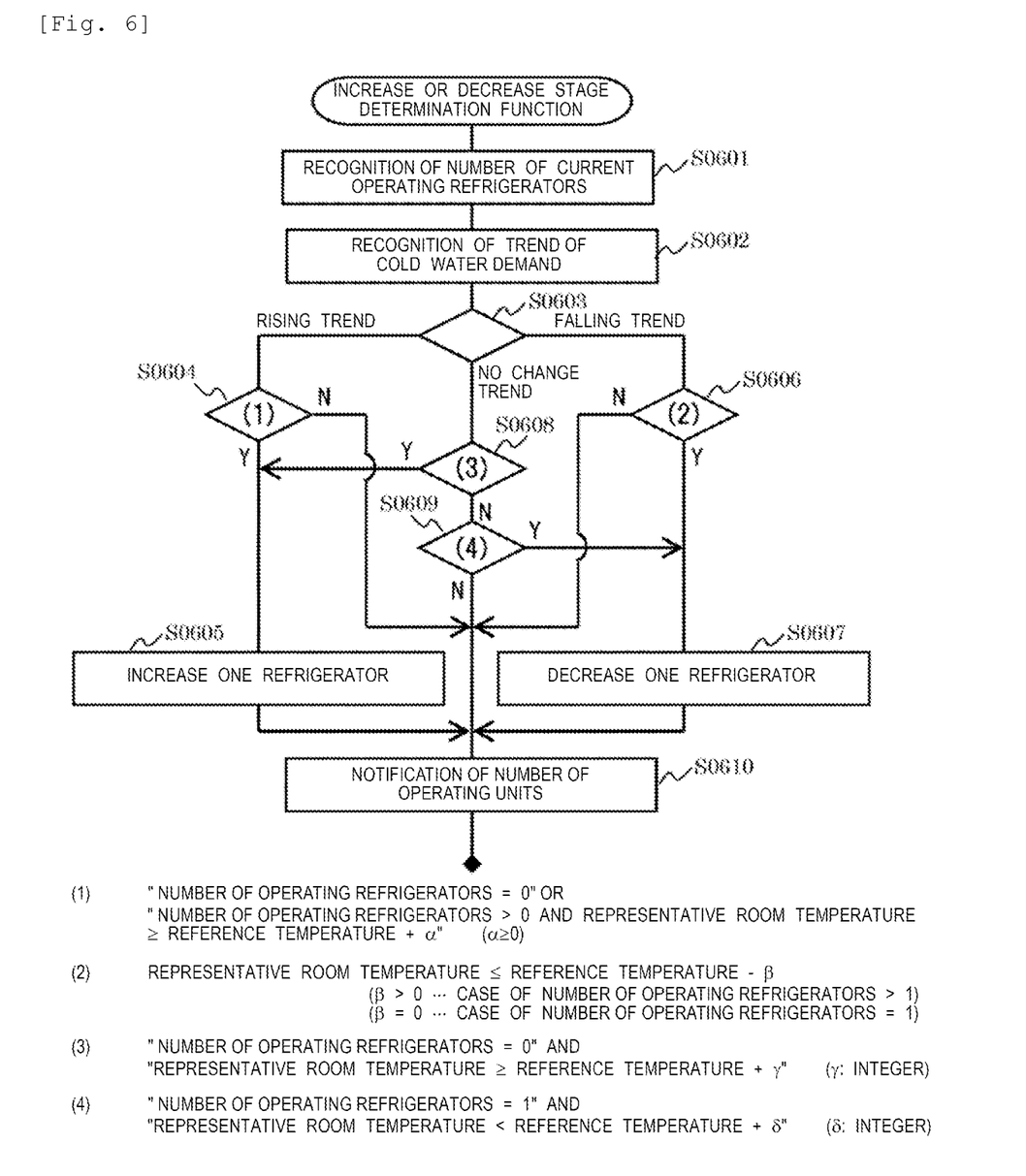
FIG. 6 is a flowchart of an increase or decrease stage determination function 0113.

FIG. 6 is a flowchart of the increase or decrease stage determination function 0113.

S0601 is a process for recognizing the number of current operating refrigerators. Information of the number of operating refrigerators is stored in an internal memory of the function 0113, and the function 0113 refers to the stored information.

S0602 is a process for recognizing the trend of the cold water demand. Trend information of the cold water demand is received from the trend determination function 0112.

S0603 is a process for condition branching in accordance with the trend of the cold water demand. When the cold water demand is the rising trend, the process proceeds to S0604. When the cold water demand is the falling trend, the process proceeds to S0606. When the cold water demand is the no change trend, the process proceeds to S0608.

When the cold water demand is the rising trend, S0604 is a branch in accordance with states of the number of operating refrigerators and a representative room temperature. The representative room temperature is the room temperature in a specific room when a plurality of the rooms 0102 exist. According to the embodiment, even though the plurality of rooms 0102 exist, since the room temperatures in respective rooms are equivalent, room temperature in any room 0102 may be selected. In the process 0604, when the number of operating refrigerators is 0, or the number of operating refrigerators is greater than 0 and the representative room temperature is equal to or greater than a reference temperature 0201+α (α≥0), it is determined as true determination, and the process proceeds to S0605. In a case of false determination, the process proceeds to S0610.

S0605 is a process for increasing one refrigerator. According to the process, one refrigerator having highest operation efficiency starts among the refrigerators stopped.

S0606 is a process for condition branching in accordance with the representative room temperature when the cold water demand is the falling trend. When the representative room temperature is smaller than the reference temperature 0201−β, it is determined as the true determination, the process proceeds to S0607. When the number of operating refrigerators is greater than one, the value of β is set to be β>0, and when the number of operating refrigerators is one, the value of β is set to be β=0. In the process, in a case of the false determination, the process proceeds to S0610.

S0607 is a process for decreasing one refrigerator. According to the process, one refrigerator having lowest operation efficiency is stopped among the refrigerators in operation.

S0608 is a process for condition branching in accordance with the number of operating refrigerators and the reference temperature when the total cold water demand is the no change trend. When the number of operating refrigerators is 0 and the representative room temperature is equal to or greater than the reference temperature 0201+γ, it is determined as the true determination, the process proceeds to S0605. In a case of the false determination, the process proceeds to S0609. The value of γ may arbitrarily be set.

In S0609, when the number of operating refrigerators is one and the representative room temperature is less than the reference temperature 0201+δ, it is determined as the true determination, and the process proceeds to S0607. Meanwhile, in a case of the false determination, the process proceeds to S0610. The value of 6 may arbitrarily be set.

S0610 is a process for notifying the number of operating units. Information of the number of operating refrigerators to which a result of increased or decreased unit is received is transmitted to the load adjustment amount calculation function 0115.

Figure 7:
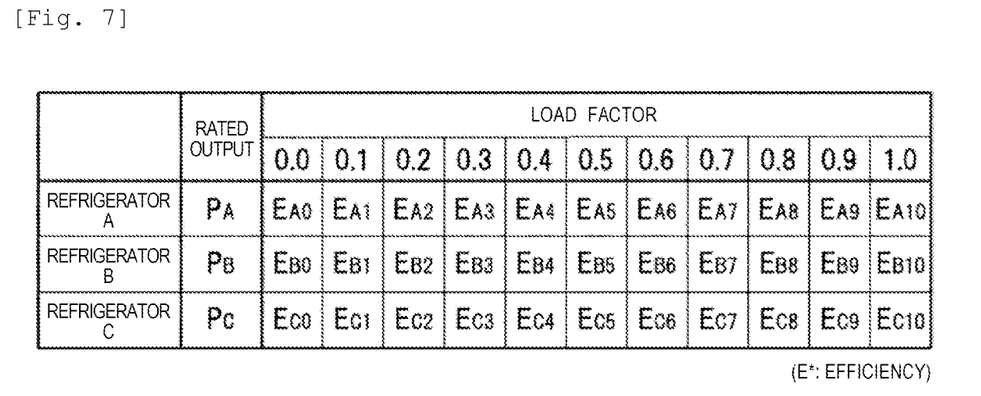
FIG. 7 is an example of a data format of a refrigerator characteristics database 0114.

FIG. 7 is an example of a data format of the refrigerator characteristics database 0114. In the database, efficiency information is recorded with respect to the rated output and the load factor for each refrigerator.

Figure 8:
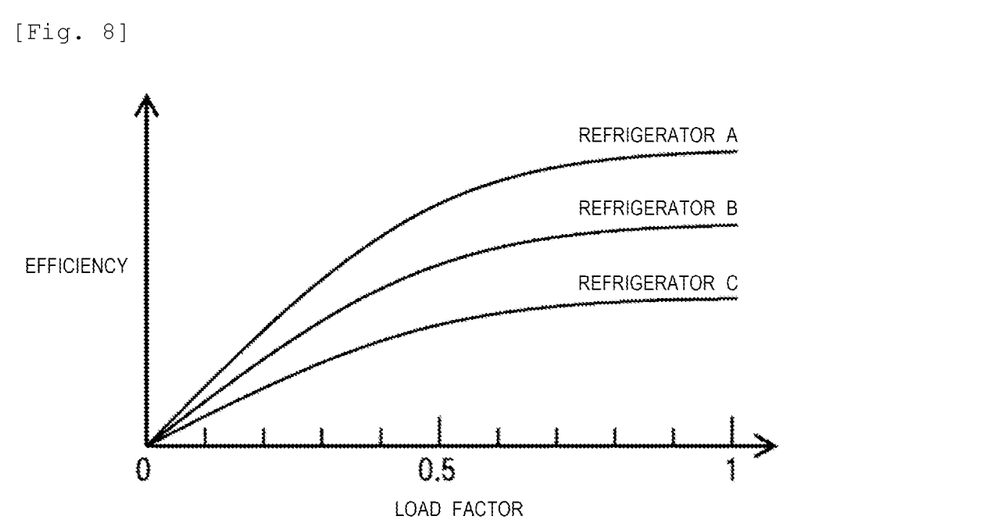
FIG. 8 is a graph of an example of efficiency characteristics with respect to a load factor of a refrigerator.

FIG. 8 is a graph of an example of efficiency characteristics with respect to the load factor illustrated in FIG. 7. Since operation efficiency is different for each refrigerator, efficiency is also different according to the refrigerator at the same load factor, as illustrated in the diagram. Here, the refrigerators have good operation efficiency in order of the refrigerators A, B, and C, and each of the refrigerators has highest efficiency when the load factor is 1. In the example, even in any load factor, the refrigerators have good efficiency in order of the refrigerator A, the refrigerator B, and the refrigerator C. However, this is because to easily explain an example. For example, a system in which the efficiency of the refrigerator B is better than that of the refrigerator A in a load factor of 0.7, and, furthermore, the efficiency of the refrigerator C is better than that of the refrigerators A and B in a load factor of 0.8, may be used. In addition, in the example, although efficiency monotonically increases in any of the load factors, this is because to easily explain an example. For example, a system in which efficiency in load 0.85 may be best in the refrigerator A, efficiency in load 0.8 may be best in the refrigerator B, and efficiency in load 0.75 may be best in the refrigerator C may be used.

An average value of the operation efficiency of each refrigerator may be used for the total operation efficiency of refrigerators at the time of operating the plurality of refrigerators.

Figure 9:
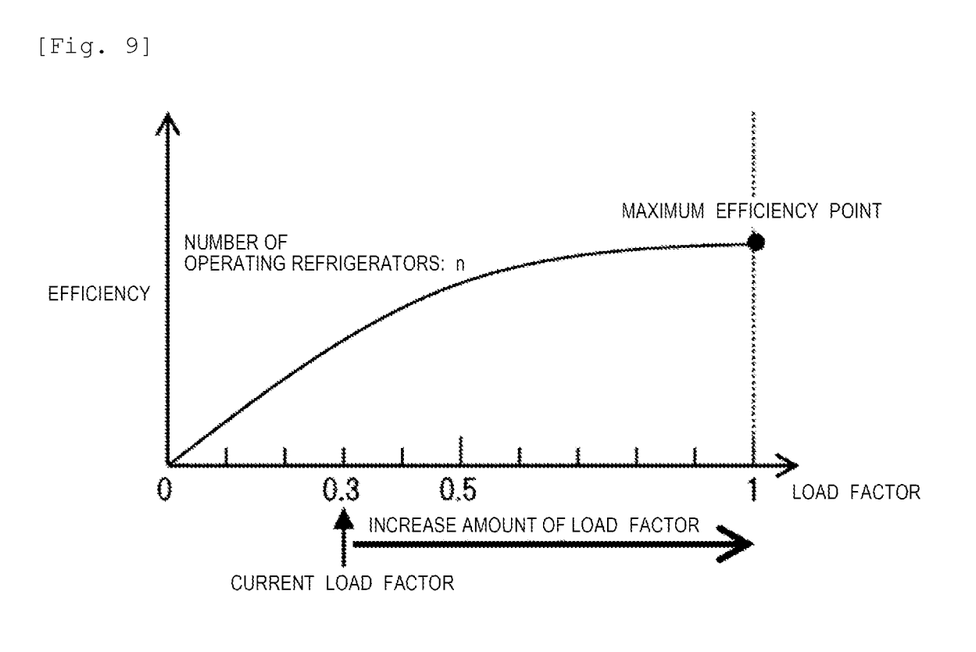
FIG. 9 is an outline of processing content of a load adjustment amount calculation function 0115.

FIG. 9 is an outline of process content of the load adjustment amount calculation function 0115. It relates to an efficiency pattern with respect to a load factor when n units of the refrigerators are operated. Similar to an example of efficiency characteristics with respect to the load factor illustrated in FIG. 8, for example, if a load factor of any one of the refrigerators A, B, and C is smaller than load 1 and efficiency becomes best, a system of which efficiency becomes best in, for example, load 0.95 even in FIG. 9 can be implemented.

In efficiency characteristics with respect to the load factor illustrated in FIG. 9, for example, it is assumed that the current load factor is 0.3. At this time, since the total operation efficiency of the refrigerator is maximized when the load factor is 1, an increase amount of the load factor is set so as to set the load factor from 0.3 to 1 according to the process.

Figure 10:
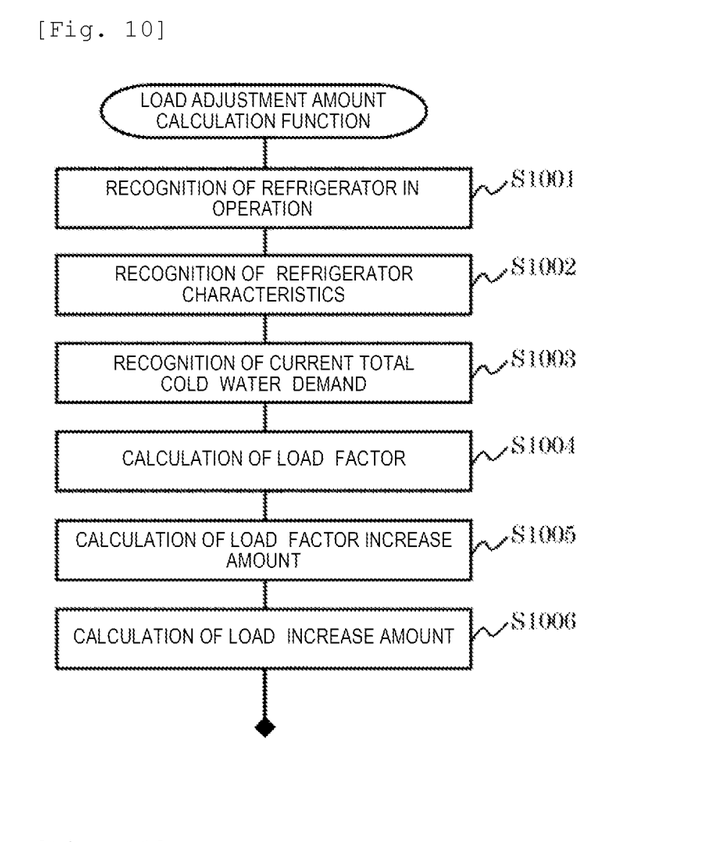
FIG. 10 is a flowchart of the load adjustment amount calculation function 0115.

FIG. 10 is a flowchart of the load adjustment amount calculation function 0115.

S1001 is a process for recognizing the refrigerator in operation. That is, it is recognized which refrigerator is in running. A recognition method of the refrigerator in running recognizes that the refrigerator is in operation in order of high operation efficiency, based on information of the number of operating units received from the increase or decrease stage determination function 0113.

S1002 is a process for recognizing refrigerator characteristics. Efficiency for the load factor is obtained with respect to the refrigerator which is recognized to be in operation in S1001 with reference to the refrigerator characteristics database 0114. Furthermore, by calculating an average value of the efficiency of the refrigerator in operation, efficiency with respect to the load factor in the total refrigerators is calculated.

S1003 is a process for recognizing the current total cold water demand. The current total cold water demand may be obtained by summing up magnitudes of the cold water load sent from each refrigerator 0101.

S1004 is a process for calculating the load factor. A current load factor value is obtained by dividing the total cold water demand calculated in S1003 by a summation value of the rated output of the refrigerator being currently in operation which is recognized with reference to the refrigerator characteristics database 0114.

S1005 is a process for calculating a load factor increase amount. An increase width used for increasing the load factor value calculated in S1004 to a load factor by which the entirety of the refrigerators can be operated in maximum efficiency is calculated.

S1006 is a process for calculating a load increase amount. In order to calculate the load increase amount, the summation value of the rated output in the refrigerator being currently in operation may be integrated with the increase width of the load factor obtained in S1005. Information of the load increase amount is output to the air-conditioning output determination function 0116.

Figure 11:
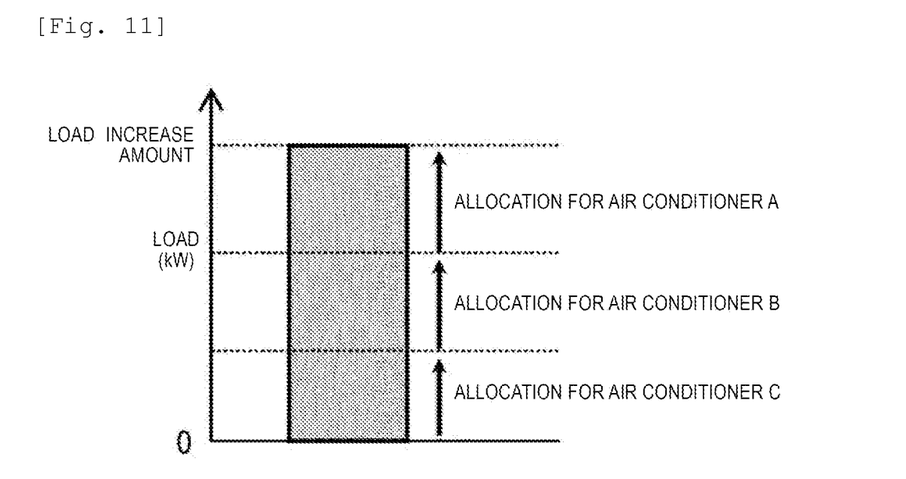
FIG. 11 is an outline of a process of an air-conditioning output determination function 0116.

FIG. 11 is a diagram illustrating an outline of a process for the air-conditioning output determination function 0116. In the process, a process for allocating a magnitude of the load increase amount calculated in the load adjustment amount calculation function 0115 for each air conditioner is performed. Here, an image in which magnitudes of the load increase amount are allocated in the air conditioners A, B, and C is illustrated.

Figure 12:
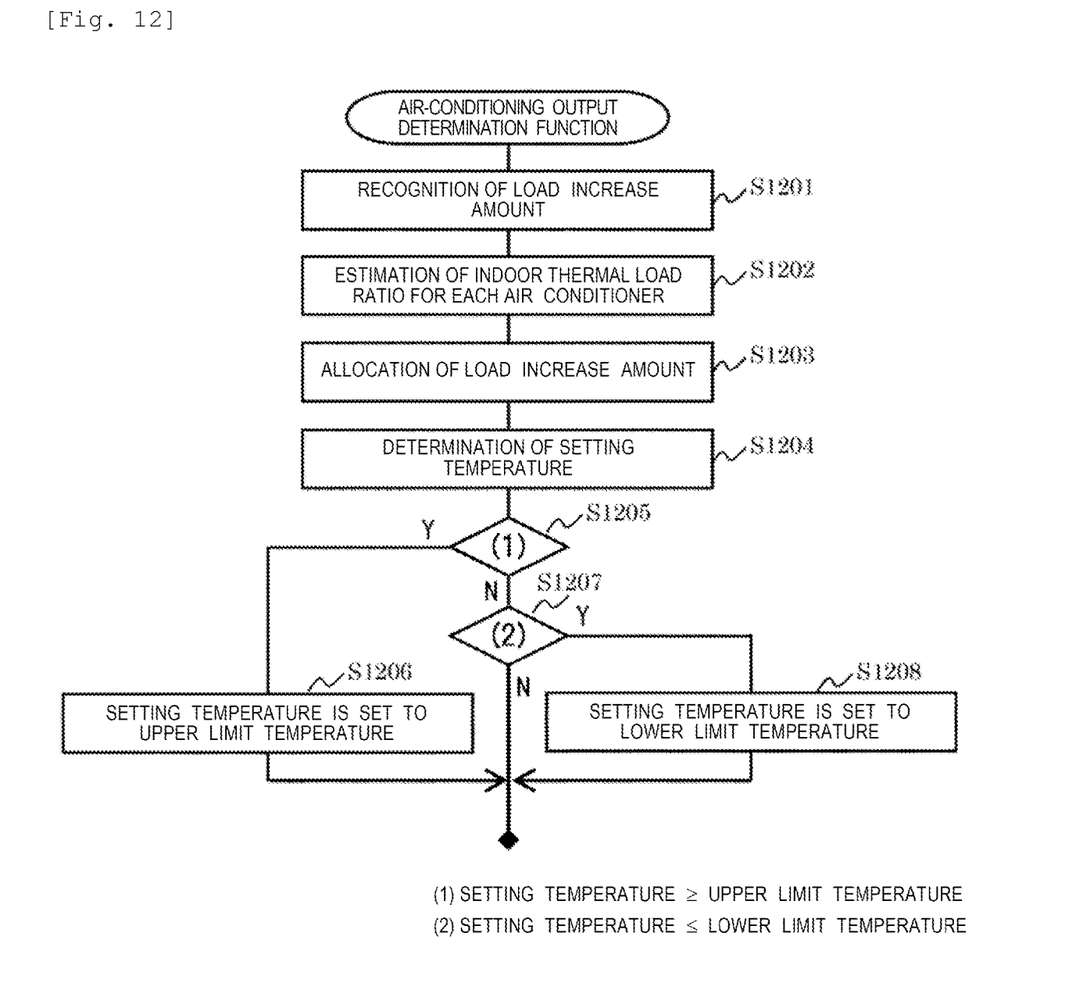
FIG. 12 is a flowchart of the air-conditioning output determination function 0116.

FIG. 12 is a flowchart of the air-conditioning output determination function 0116.

S1201 is a process for recognizing the load increase amount. Information of the load increase amount is received from the load adjustment amount calculation function 0115.

S1202 is a process for estimating a ratio of an indoor thermal load for each air conditioner. Thermal load refers to energy produced by all of a heat-source (human, computer, or the like) being inside the room or heat invaded from outside of the room. In the process, a ratio of the magnitude of the thermal load for each air conditioner is obtained. A method for obtaining the ratio may be any method. For example, when the number of the air conditioners is three, if the air conditioners are operated while maintaining the air-conditioning output at a constant and room temperature increase amounts are 1° C., 1° C., and 2° C., respectively, at a constant time, it is possible to obtain the ratio of the magnitude of the thermal load as 1:1:2.

S1203 is a process for allocating the load increase amount for each air conditioner. The allocation of the load adjustment amount for each air conditioner is performed by using Equation 2.

$$Q_n = Q_0 \times \frac{R_n}{\sum_{i=1}^{N} R_i} \qquad \text{Equation 2}$$

Here, Qn is the load increase amount with respect to the air conditioner n, Q0 is the load increase amount calculated in the load adjustment amount calculation function 0115, Rn is the ratio of the magnitude of the thermal load of the air conditioner n obtained in S1202, and N is the number of the air conditioners.

Figure 13:
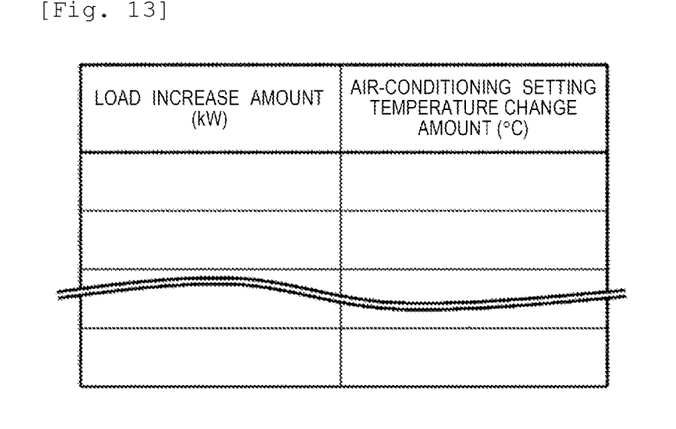
FIG. 13 is an example of a data format of a setting temperature database 0117.

S1024 is a process for determining a setting temperature for each air conditioner. In the process, by referring to information of the setting temperature database 0117, a setting temperature for actually increasing the load amount to be increased for each air conditioner calculated in S1203 is determined. In order to determine the setting temperature, the setting temperature database 0117 is used. FIG. 13 is an example of a data format of the setting temperature database 0117. In the database, an amount of change in a setting temperature for increasing a desired load is recorded for each air conditioner. Data to be recorded in the database may be appropriately customized for each outside air temperature, for each pre-air-conditioning setting temperature, or the like. In S1204, a new setting temperature is determined by adding the amount of change in the setting temperature recorded in the setting temperature database 0117 to the pre-air-conditioning setting temperature received from the sensor 0104.

S1205 is a process for condition branching according to comparison between the setting temperature determined in S1204 and the upper limit temperature 0202 set by the people in the room. When the setting temperature determined in S1204 is equal to or greater than the upper limit temperature 0202, the process proceeds to S1206 and the setting temperature is set to the upper limit temperature in S1206. Meanwhile, in S1205, when the setting temperature determined in S1204 is less than the upper limit temperature 0202, the process proceeds to S1207.

S1207 is a process for condition branching according to comparison between the setting temperature determined in S1204 and the lower limit temperature 0203 set by the people in the room. When the setting temperature determined in S1204 is equal to or less than the lower limit temperature 0203, the process proceeds to S1208 and the setting temperature is set to the lower limit temperature in S1208. Meanwhile, in S1207, when the setting temperature determined in S1204 is greater than the lower limit temperature 0203, the setting temperature determined in S1204 is instructed to an air conditioner.

Figure 14:
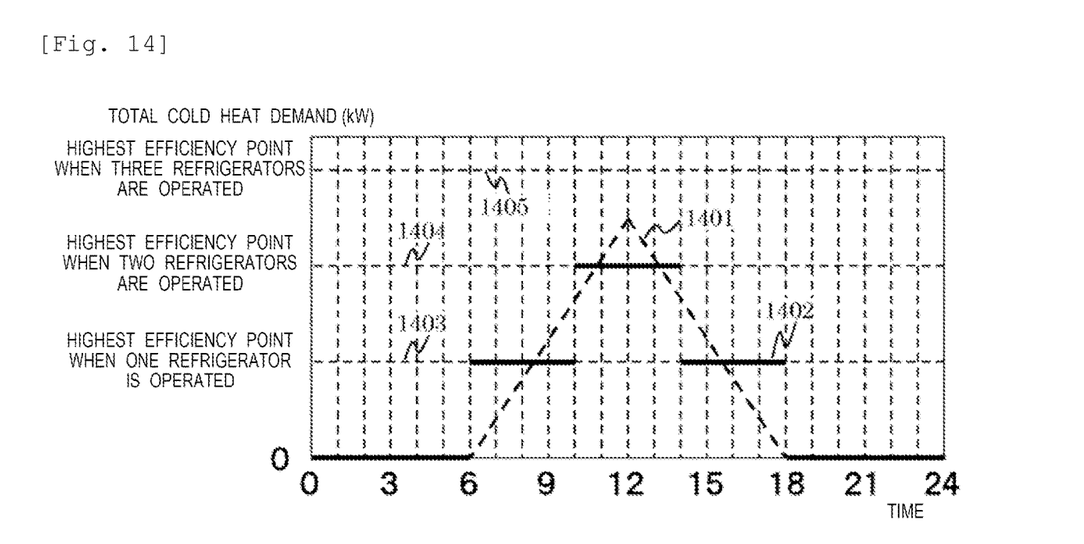
FIG. 14 is a diagram illustrating an energy conservation effect according to an embodiment.

FIG. 14 is a diagram illustrating an energy conservation effect according to the embodiment. Reference numeral 1401 represents an example of an operation method of general air-conditioning and the total cold water demand when a setting temperature is a constant value. Meanwhile, Reference numeral 1402 represents an example of the total cold water demand according to the embodiment. Values of 1403, 1404, and 1405 in a vertical axis are the maximum efficiency point when one refrigerator is operated, the maximum efficiency point when two refrigerators are operated, and the maximum efficiency point when three refrigerators are operated, respectively. The efficiency is not the maximum value at positions other than 1403, 1404, and 1405 in the vertical axis. Here, when 1401 and 1402 are compared with each other, integrated values (that is, area) of the total cold heat demand throughout a day are approximately the same. Meanwhile, regarding values of the total cold heat demand in each time, in 1401, there are a lot of time zones in which the efficiency of the refrigerator is not the maximum value, but 1402 that is the embodiment is always on the maximum efficiency point. Accordingly, since an amount of energy consumed by a heat-source system is a value obtained by multiplying the efficiency of the refrigerator to the integrated value of the total cold heat demand throughout a day, it is possible to increase the energy conservation effect compared to a case where the setting temperature in the related art is constant, according to the embodiment.

Furthermore, in the control method represented in PTL 1, a setting temperature of the air-conditioning sticks to the upper limit value 0302. However, in the embodiment, as illustrated in FIG. 3, since the setting temperature 0304 can be set to a value close to the reference value 0301 compared to the case of PTL 1, it is possible to improve the comfort of the people in the room.

The present invention is not limited to the embodiments described above, and includes various modifications. For example, embodiments described above are described in detail in order to better illustrate the present invention, and are not intended to be limited to those having necessarily all described configurations.

REFERENCE SIGNS LIST

0101 refrigerator
0102 room
0103 air conditioner
0104 sensor function
0105 input function
0106 output function
0107 first water pipe
0108 second water pipe
0109 thermal demand adjustment device
0110 weather forecast obtainment function
0111 demand history database
0112 trend determination function
0113 increase or decrease stage determination function
0114 refrigerator characteristics database
0115 load adjustment amount calculation function
0116 air-conditioning output determination function
0117 setting temperature database
0201 reference value of setting temperature
0202 upper limit value of setting temperature
0203 lower limit value of setting temperature
0204 set button
0301 reference value of setting temperature
0302 upper limit value of setting temperature
0303 lower limit value of setting temperature
0304 setting temperature of air conditioner
1401 example of total cold water demand when setting temperature is constant
1402 example of total cold water demand in the embodiment
1403 maximum efficiency point when one refrigerator is operated
1404 maximum efficiency point when two refrigerators are operated
1405 maximum efficiency point when three refrigerators are operated

The invention claimed is:

1. A thermal demand adjustment device for an energy network, the energy network including a plurality of heat-source devices, a fluid path, and a plurality of air conditioners to which heat from the plurality of heat-source devices is transmitted through the fluid path, in which the plurality of heat-source devices are operated as a number of units according to a number of operating units notification signal and operated so as to set fluid in the fluid path to a predetermined value, and the plurality of air conditioners are operated to exchange thermal energy with the fluid path so as to approach an instruction value, the thermal demand adjustment device is configured to:
  generate the number of operating units notification signal indicating which heat-source device is to be operated among the plurality of heat-source devices based on a determination of a trend in the thermal demand, where the trend includes categories of increasing, decreasing, and being not greatly changed;
  calculate the thermal demand exchanged in an air conditioner of the plurality of air conditioners; and
  generate the instruction value to the air conditioner of the plurality of air conditioners so as to improve efficiency of a corresponding heat-source device based on load characteristics of the corresponding heat-source device according to the calculated thermal demand, wherein the thermal demand is obtained by subtracting a total current cold water demand from a predicted total cold water demand at a time later than a current time.

2. The thermal demand adjustment device for an energy network according to claim 1,
  wherein a total load of the plurality of heat-source devices is controlled so as to be a desired magnitude.

3. The thermal demand adjustment device for an energy network according to claim 1,
  wherein the instruction value is obtained based on efficiency with respect to a load factor in the plurality of heat-source devices.

4. The thermal demand adjustment device for an energy network according to claim 3,
  wherein the number of operating units of the plurality of heat-source devices is determined based on at least any one of an amount of heat generation inside a room and a magnitude of invaded heat from outside.

5. The thermal demand adjustment device for an energy network according to claim 4,
  wherein the instruction value is a setting temperature of the air conditioner.

6. The thermal demand adjustment device for an energy network according to claim 1,
  wherein the plurality of heat-source devices are controlled to start or stop based on temperature information of a room in which the air conditioner is installed.

7. The thermal demand adjustment device for an energy network according to claim 1,
  wherein the plurality of heat-source devices are refrigerators.

8. A thermal demand adjustment method for an energy network including a plurality of heat-source devices, a fluid path, and a plurality of air conditioners to which heat from the plurality of heat-source devices is transmitted through the fluid path, in which the plurality of heat-source devices are operated as a number of units according to a number of operating units notification signal and operated so as to set fluid in the fluid path to a predetermined value, and the plurality of air conditioners are operated to exchange thermal energy with the fluid path so as to approach an instruction value, the method comprising:
- generating the number of operating units notification signal indicating which heat-source device is to be operated among the plurality of heat-source devices based on a determination of a trend in the thermal demand, where the trend includes categories of increasing, decreasing, and being not greatly changed;
- calculating the thermal demand exchanged in an air conditioner of the plurality of air conditioners; and generating the instruction value to the air conditioner of the plurality of air conditioners so as to improve efficiency of the plurality of heat-source devices based on load characteristics of the plurality of heat-source devices according to the calculated thermal demand, wherein
- the thermal demand is obtained by subtracting a total current cold water demand from a predicted total cold water demand at a time later than a current time.

* * * * *